Dec. 18, 1945.    H. C. SMITH    2,391,355
STREET INDICATING DEVICE FOR VEHICLES
Filed Dec. 23, 1940    7 Sheets-Sheet 1
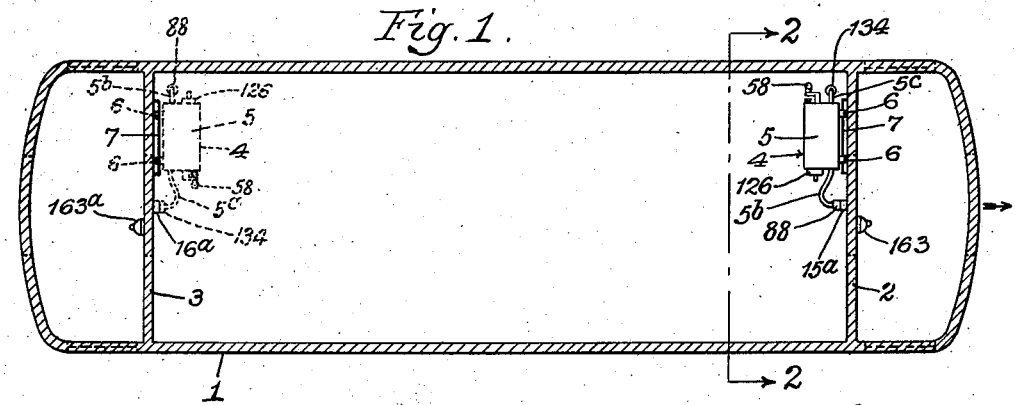
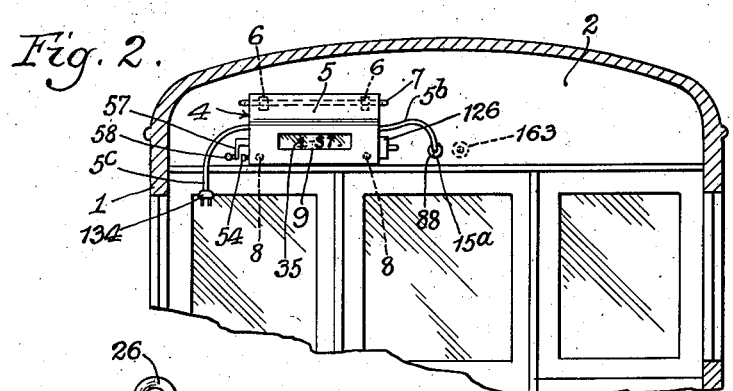
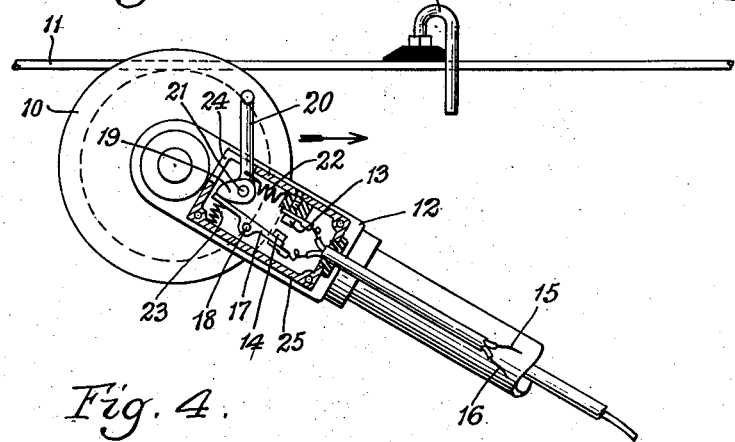
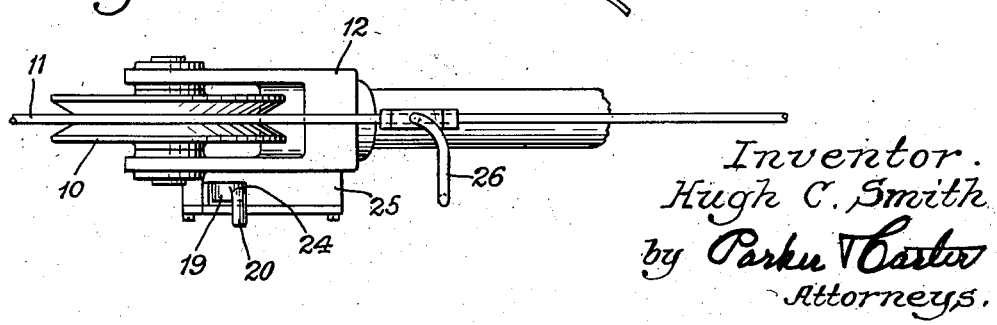
Inventor.
Hugh C. Smith
by Parker & Carter
Attorneys.

Dec. 18, 1945.  H. C. SMITH  2,391,355
STREET INDICATING DEVICE FOR VEHICLES
Filed Dec. 23, 1940  7 Sheets-Sheet 2
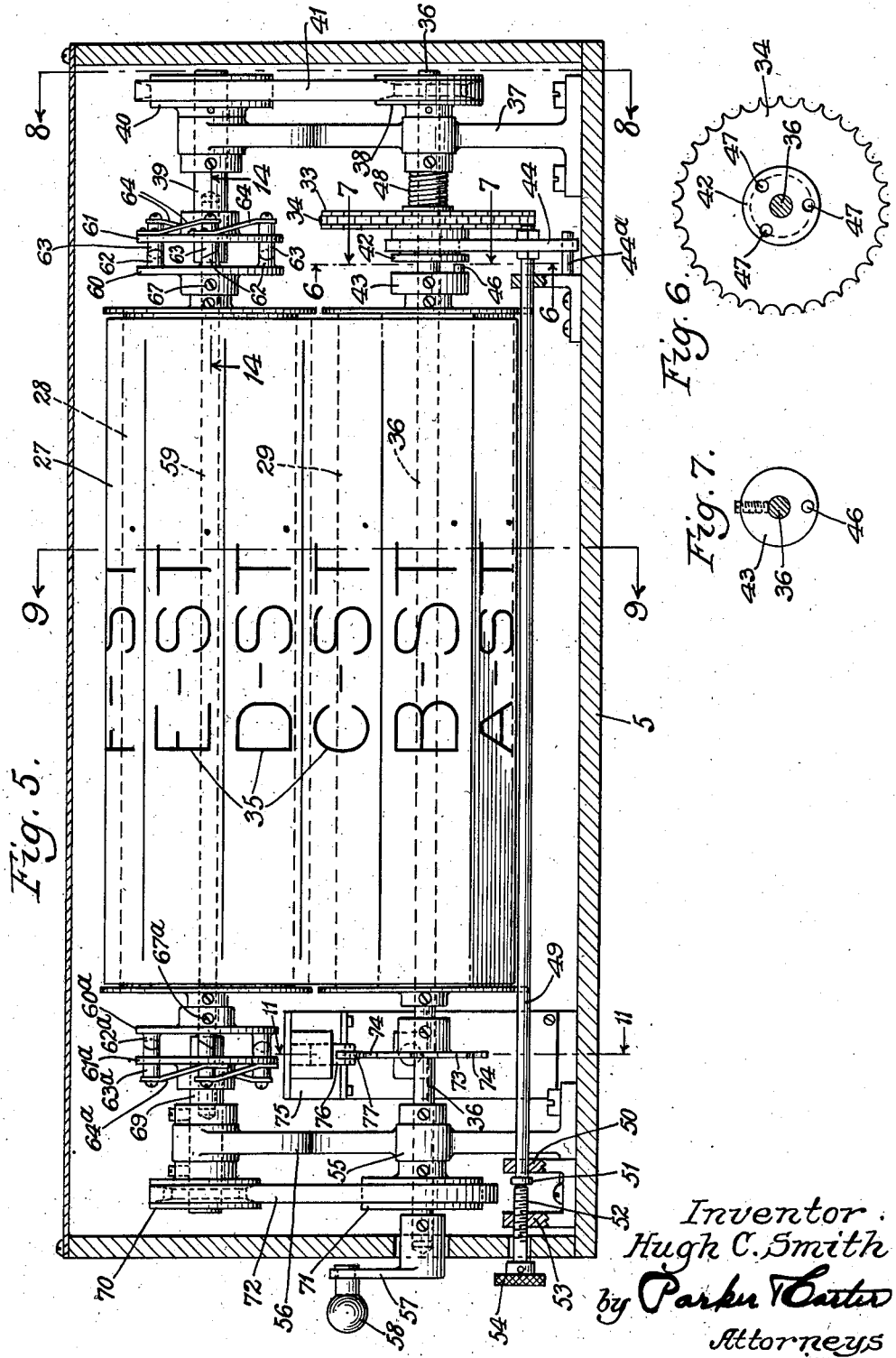
Inventor
Hugh C. Smith
by Parker & Carter
Attorneys Dec. 18, 1945.  H. C. SMITH  2,391,355
STREET INDICATING DEVICE FOR VEHICLES
Filed Dec. 23, 1940  7 Sheets-Sheet 3

Inventor.
Hugh C. Smith.
by Parker & Carter
Attorneys.

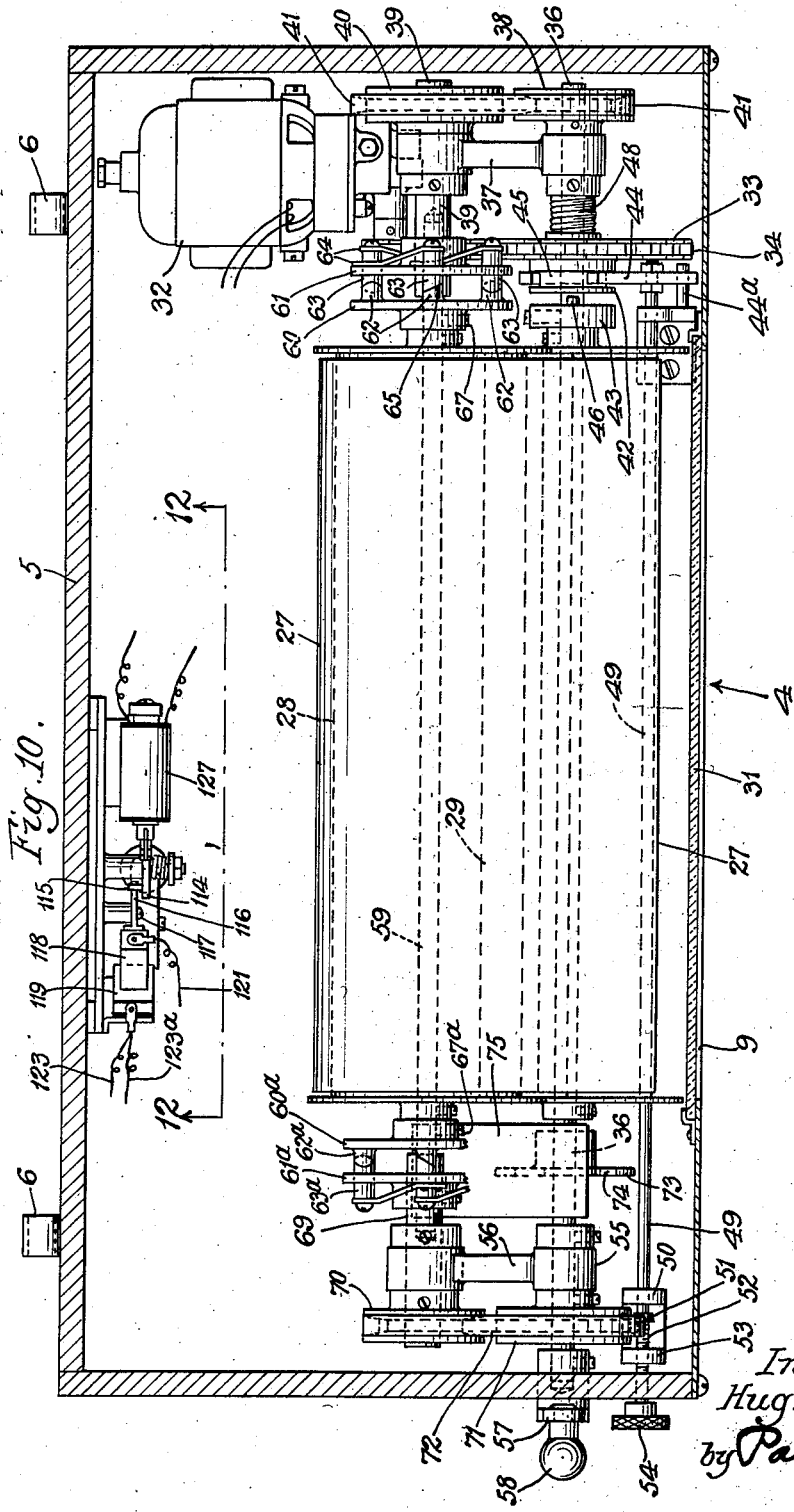

Dec. 18, 1945.   H. C. SMITH   2,391,355
STREET INDICATING DEVICE FOR VEHICLES
Filed Dec. 23, 1940    7 Sheets-Sheet 5
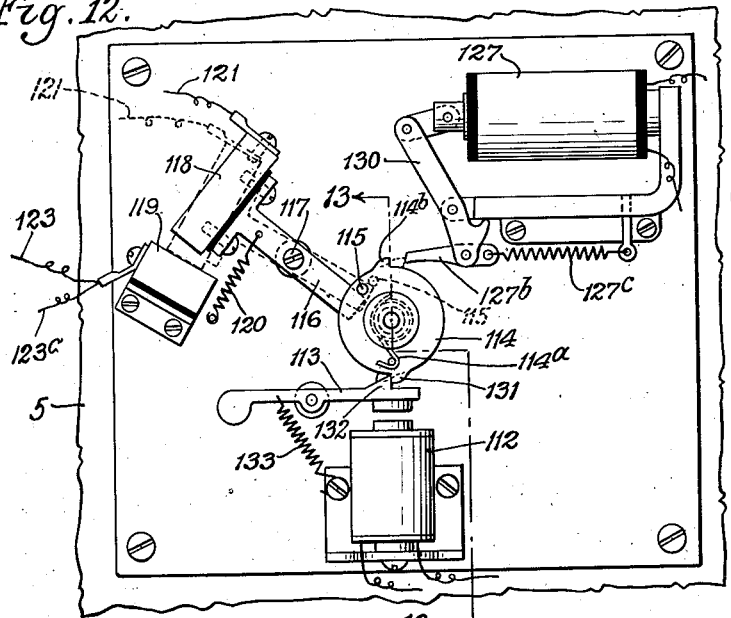
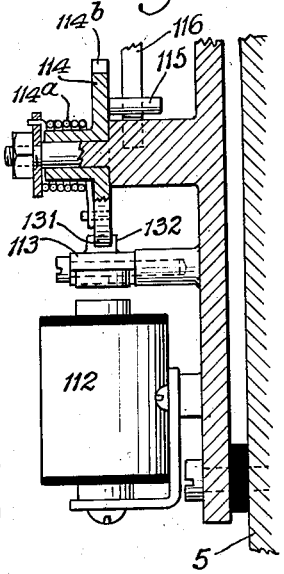
Inventor.
Hugh C. Smith.
by Parker & Carter
Attorneys.

Dec. 18, 1945.  H. C. SMITH  2,391,355
STREET INDICATING DEVICE FOR VEHICLES
Filed Dec. 23, 1940  7 Sheets-Sheet 6
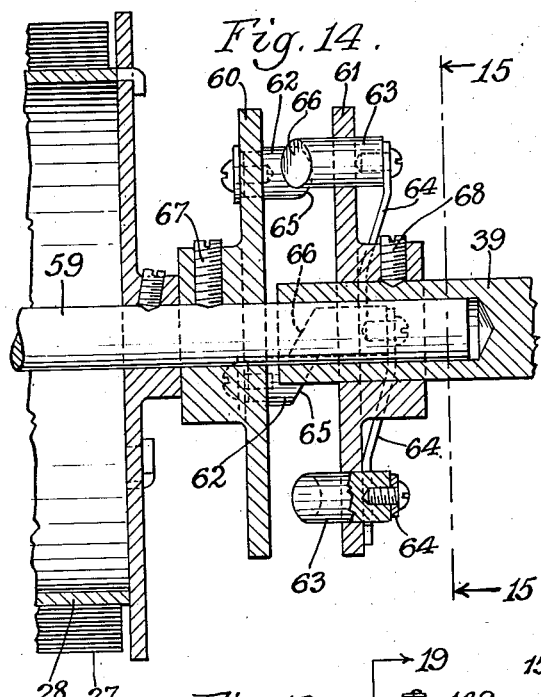
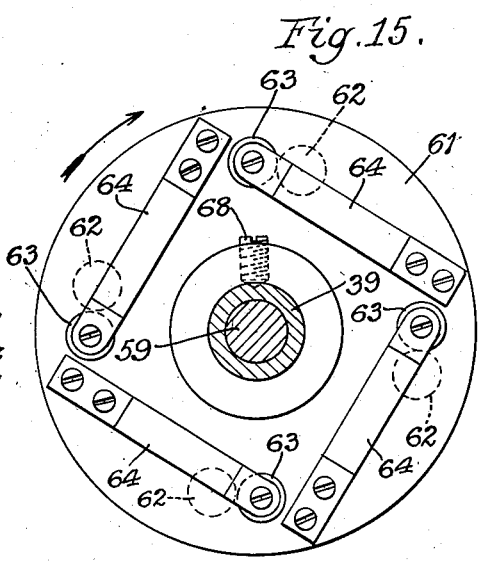
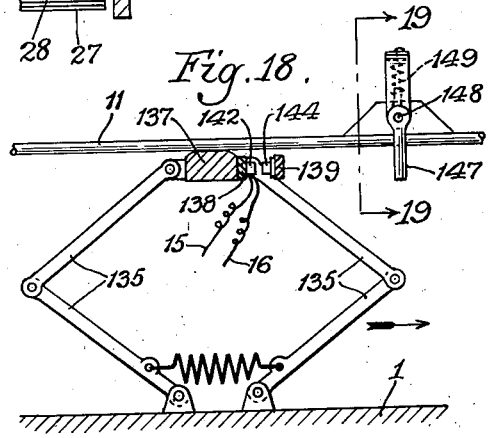
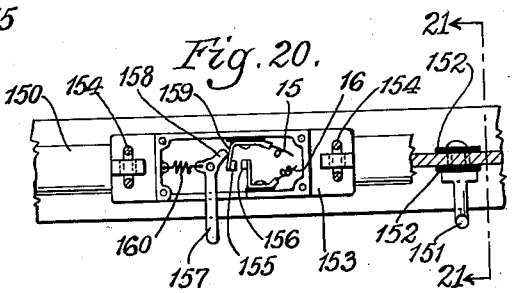
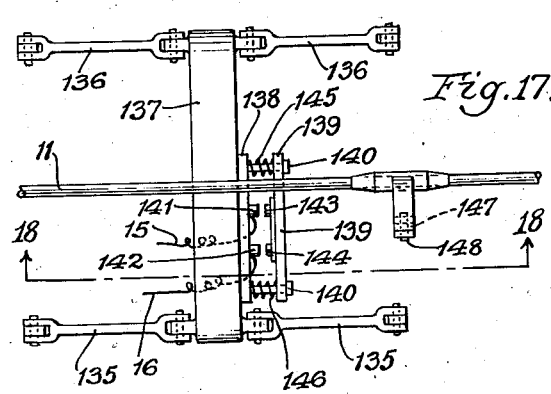
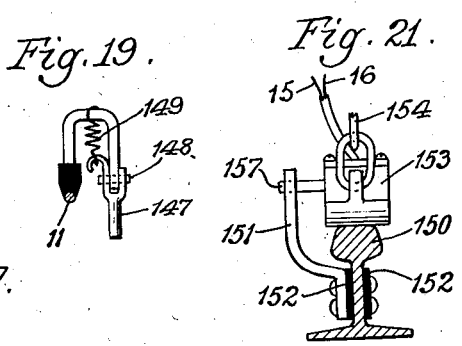
Inventor.
Hugh C. Smith.
by Parker Carter
Attorneys.

Dec. 18, 1945.   H. C. SMITH   2,391,355
STREET INDICATING DEVICE FOR VEHICLES
Filed Dec. 23, 1940   7 Sheets-Sheet 7

Inventor.
Hugh C. Smith.
by Parker & Carter
Attorneys.

Patented Dec. 18, 1945

2,391,355

UNITED STATES PATENT OFFICE 2,391,355

STREET INDICATING DEVICE FOR VEHICLES

Hugh C. Smith, Chicago, Ill.

Application December 23, 1940, Serial No. 371,330

1 Claim. (Cl. 40—57)

This invention relates to improvements in street indicating devices for vehicles and particularly for passenger carrying vehicles, and has for its object to provide a new and improved device of this description.

The invention has as a further object to provide a street indicating device located on a vehicle, having the street names located on a flexible piece mounted on rollers, with means for keeping the flexible piece tight at all times. The invention has as a further object to provide a street indicating device for vehicles where the names of the streets are on a flexible strip which passes around non-circular rollers, preferably hexagon shape, about which the flexible strip is wound.

The invention has as a further object to provide a street indicating device located on the inside of a vehicle which automatically indicates to the people in the vehicle the streets as the vehicle approaches such streets, so that the people in the vehicle will know just where they are and just when it is time to leave the vehicle. The invention has as a further object to provide a street indicating device located on the inside of a vehicle, with means for operating it electrically, mechanically or manually. The invention has as a further object to provide a street indicating device for vehicles which can be easily and quickly transferred from one end of the vehicle to the other.

The invention has other objects which are more particularly pointed out in the accompanying description.

Referring now to the drawings:

Fig. 1 is a sectional view of an electrically driven vehicle, the section being taken just under the roof, showing the street indicating device in position, the seats and motorman's equipment being omitted;

Fig. 2 is a sectional view taken on line 2—2 of Fig. 1;

Fig. 3 is a side elevation in part section, of the upper end of a trolley arm and wheel, showing a switch for the street indicating device and a trip finger on the trolley wire;

Fig. 4 is a plan view of the device shown in Fig. 3;

Fig. 5 is a front elevation of one form of street indicating device with the enclosing box in section;

Fig. 6 is a sectional view taken on line 6—6 of Fig. 5;

Fig. 7 is a sectional view taken on line 7—7 of Fig. 5;

Fig. 10 is a sectional view taken on line 10—10 of Fig. 8;

Fig. 11 is a sectional view taken on line 11—11 of Fig. 5;

Fig. 12 is a view showing the electric make and break mechanism for the electric motor which drives the rollers upon which the flexible strip with the names of the streets is wound;

Fig. 13 is a sectional view taken on line 13—13 of Fig. 12;

Fig. 14 is a sectional view taken on line 14—14 of Fig. 5;

Fig. 15 is a sectional view taken on line 15—15 of Fig. 14;

Fig. 17 is a plan view showing a modified construction showing the circuit making and breaking device used in connection with the bow type of trolley;

Fig. 18 is a sectional view taken on line 18—18 of Fig. 17;

Fig. 19 is a sectional view taken on line 19—19 of Fig. 18;

Fig. 20 is a plan view, with parts removed, showing a modified construction of circuit making and breaking device for use in connection with third rail systems;

Fig. 21 is a sectional view taken on line 21—21 of Fig. 20.

Like numerals refer to like parts throughout the several figures.

Figure 8:
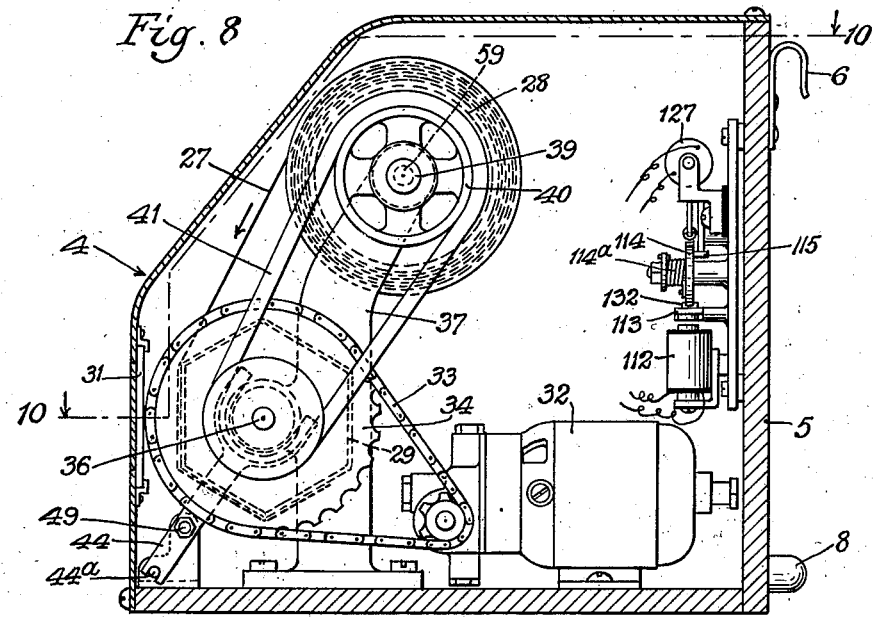
Fig. 8 is a sectional view taken on line 8—8 of Fig. 5.
Figure 9:
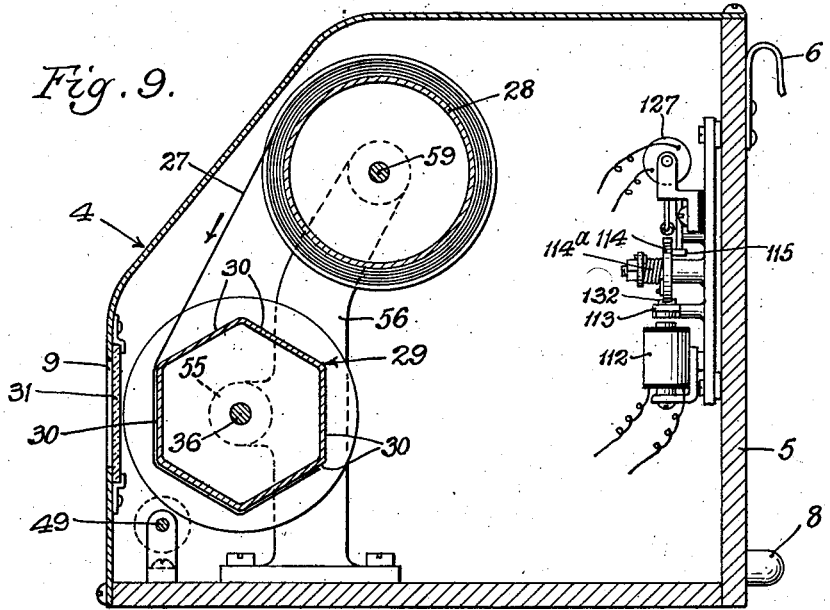
Fig. 9 is a sectional view taken on line 9—9 of Fig. 5.

In Figs. 1 to 16 inclusive I have shown one form of the invention as used in electrically driven vehicles. In this construction the body 1 of the vehicle is provided at the ends with the cross members 2 and 3. The street indicating device is indicated generally at 4 as being mounted upon the cross member 2 so as to be in full view of the people in the vehicle. The mechanism of the street indicating device is provided with an enclosing box 5 which is supported at the rear with the supporting members 6 which are hooked over a supporting bar 7 attached to the cross members 2 and 3. These supporting members 6 are preferably located near the top of the box. The bottom portion of the box is provided with one or more projections 8 which engage either the cross member 2 or the cross member 3, depending upon which one of the cross members the box is supported.

In the construction shown in these figures there is an electrically operated shifting mechanism for shifting the member having the street names thereon to cause such names to be exposed through the opening 9 in the front of the box. In order to actuate this mechanism I provide a means for completing the circuit through the shifting mechanism at the proper point along the way. In Figs. 3 and 4 I have shown a construction to be used in connection with a trolley wheel 10 which runs along a trolley wire 11. Upon the arm 12 supporting the trolley wheel, there is provided a switch having contacts 13 and 14 which are connected to conductors 15 and 16 which extend along the trolley support to suitable outlets or plug sockets 15a and 16a in the vehicle. The contact 14 is mounted upon an arm 17, pivoted at 18. Associated with the arm 17 is a switch actuating member 19 which is connected with an arm 20 pivoted at 21. The switch actuating member is held in the position shown in Fig. 3 to hold the contacts 13 and 14 apart, by the spring 22. There is a spring 23 associated with the switch arm 17 which acts to normally keep the contacts 13 and 14 separated. The arm 20 projects through an opening 24 in the switch casing 25. At each street intersection there is provided a switch actuating member 26 for the switch on the trolley arm. When the trolley wheel moving along the trolley wire reaches the proper position for indicating the proper street, the pivoted arm 20 engages the switch actuating member 26 and is moved so that the switch actuating member 19 moves the switch arm 17 to bring contacts 13 and 14 together to complete the circuit. This completion of the circuit is momentary only, for when the pivoted arm 20 passes the switch actuating member, the spring 22 moves it back to its initial position to maintain the contacts 13 and 14 separated.

The street indicating mechanism and the shifting mechanism are located within the box 5. The names of the streets or other data it is desired to use are placed on a flexible strip 27 which is wound upon a roller 28 and which as the vehicles move along, is gradually unwound from the roller 28 onto the roller 29. The roller 29 is preferably a non-circular roller, such as a hexagon roller, having flat sides 30. As the roller 29 is moved, these flat sides are successively exposed through the opening 9 in the box, which opening is preferably provided with a glass 31. The indicating data on the strip 27 are so positioned that one of them is always opposite a flat side as the roller 29 is turned, so as to be exposed to the people in the vehicle through the glass 31.

The rollers 28 and 29 are actuated in any desired manner. As herein shown they are actuated by an electromagnetic device, shown here as an electric motor 32. This motor drives a belt 33 which passes around a pulley 34 associated with the roller 29. Means is provided for actuating the roller 29 to move it a sufficient amount at each actuation to bring the flat sides 30 successively opposite the opening 9 and successively display the names of the different streets through this opening. The pulley 34 is preferably a toothed wheel and the belt 33 is preferably a link belt which works on these teeth, so that the movement of the roller 29 will be a specific accurate movement at each actuation. The indicating data 35 are shown in Fig. 5 in the particular form of the device herein illustrated.

The pulley 34 is mounted on a shaft 36 mounted upon a support 37, see Fig. 10. There is a pulley 38 on this shaft. There is another shaft 39 mounted upon the support 37, having a pulley 40 thereon. The belt 41 connects these two pulleys together. The pulley 34 is loosely mounted on the shaft 36 so as to freely rotate thereon, but so as to be slidable longitudinally therealong, and is provided with a clutch member 42. The roller 29 is securely mounted on the shaft 36. A clutch member 43 is connected to said shaft and cooperates with the clutch member 42. The clutch member 42 is provided with a forked controlling member 44, the fork of which works in a groove 45 of the clutch member. These clutch members may be of any desired form. As herein shown the clutch member 43 is provided with projections 46 which fit into openings 47 in the clutch member 42. The clutch members are moved into engagement and held normally in engagement by a spring 48. When the clutch members are in engagement, the roller 29 is operatively connected with the motor 32.

The clutch members are disconnected in any desired manner. As herein shown, there is a rod 49 which is connected to the forked controlling member 44. This rod extends along the inside of the box 5 and has a bearing 50 at the other end thereof and is preferably provided with an enlarged head 51. A threaded actuating member 52 passes through a threaded opening in the part 53. The actuating member 52 has a thumb-piece 54 on the outside of the box, by means of which it is rotated. By rotating this thumb-piece in one direction the rod 49 is moved so as to move the forked controlling member 44 to the right, Fig. 10, and disconnect the two clutch members 42 and 43, thus disconnecting the roller 29 from the motor 32. The forked controlling member 44 slides along a guiding pin 44a during its movement. The shaft 36 projects through a bearing 55 in the support 56. This shaft 36 may be actuated manually by means of a crank 57 having a handle 58, the crank and handle being outside of the box 5. By this means, when the clutch members are disconnected, the roller 29 may be moved by hand so as to move the strip 27 with the street names thereon to any desired position.

The shaft 39 is a short shaft. The roller 28 is mounted upon and fixed to a shaft 59 which is connected with the shaft 39 by a suitable connecting and releasing device, consisting of the clutch members 60 and 61, see Fig. 14. The end of the shaft 59 projects into a central opening in the shaft 39. In the particular construction shown the clutch member 60 is provided with a series of projections 62 fixed thereto. The clutch member 61 has a series of movable projections 63 which extend through holes in the clutch member and which are provided with springs 64 which normally press them toward the projections 62. The projections 62 have at their ends beveled faces 65 and the projections 63 have at their ends beveled faces 66. The clutch member 60 is fastened to the shaft 59 by a set screw 67 and the clutch member 61 is fastened to the shaft 39 by a set screw 68.

When the shaft 59 is rotated in one direction, the ends of the projections 62 and 63 which overlap engage each other, so that the roller 28 is rotated, see Figs. 14 and 15. When the shaft 59 is rotated in the opposite direction, the beveled faces of the projections engage each other and the projections are moved away from the projections 62, so that the clutch member 61 passes the clutch member 60 without connecting therewith and without rotating the roller 28. When the projections pass each other the spring 64 again moves the projections 63 so that they will be in the path of the projections 62. The shaft 59 is provided at the other end with a similar clutch to which I have applied similar reference numerals with the exponent $a$, by means of which it is connected and disconnected to a short shaft 69. The end of the roller shaft 59 extends into an opening in the shaft 69. The roller shaft 59 and the roller 28 are thus held in position by these two short shafts 39 and 69 and the supports 37 and 56. There is a pulley 70 on the shaft 69 and a pulley 71 on the shaft 36, these pulleys being connected by a belt 72.

The electric motor is controlled in any desired manner. As herein shown the shaft 36 is provided with a notched wheel 73, see Fig. 11, having on its periphery notches 74. In proximity to this notched wheel is an electric switch device mounted in a casing 75. Mounted in the casing 75 is a member 76 preferably provided at its end with a roller 77 which engages the periphery of the notched wheel 73, which roller is pressed toward the notched wheel 73 by the spring 78. The member 76 is connected with a switch contact member 79 pivoted at 80 and which has thereon an electric contact 81 insulated from the switch contact member 79. Opposed to the contact 81 are the electrical contacts 82 and 83 mounted upon springs 84 and 85. Conductor 86 is connected with the contact 83 and a conductor 87 is connected with the contact 82. These conductors form an extension and are connected to a plug 88 adapted to be inserted in the socket 15a in the wall of the vehicle. This socket is provided with a plurality of contacts 89, 90, 91, 92, 93, 94 and 95. The contacts 94 and 95 are connected by conductors 96 and 97 with the conductors 98 and 99, to which conductors 15 and 16, connected with the switch on the trolley, are connected. The contacts 89, 90 and 91 are connected together by the conductor 100. The contacts 92 and 93 are connected together by the conductor 101. The contacts 91 and 92 are connected to the source of current on the vehicle by the conductors 102 and 103.

The plug 88 is provided with a series of contacts 104, 105, 106, 107, 108, 109 and 110. The contact 104 is connected by a conductor 111 with the magnet 112, connected by conductor 112b with contact 108. This energizes the magnet 112 and it moves its armature 113 down to release the member 114. This member has a projection 115 which engages a lever 116 pivoted at 117 and provided with contact 118 opposed to a contact 119. The movement of the member 114 releases the lever 116 and the spring 120 moves the contact 118 into contact with the contact 119. Contact 118 is connected by conductor 121 with the motor 32. Contact 119 is connected by conductor 123 with the conductor 124, which is connected with contact 109. The electric motor 32 is connected to conductor 125, which is connected to contact 107. There is a switch 126 to make or break the circuit through these conductors. The rotation of the motor causes roller 29 to rotate to bring the next street number opposite the glass 31 and it also rotates the notched wheel 73 and the roller 77 drops into one of the notches 74 thereon and the contact 81 connects the two contacts 82 and 83 and completes the circuit through the solenoid 127, this circuit being as follows: from contact 110 through conductor 87 to contact 82, thence to contact 83, thence by conductor 86 to conductor 128, and thence by conductor 129 to contact 106. The solenoid 127 is then energized and it moves the lever 130 so that the member 127b moves the member 114 until the contacts 118 and 119 are separated and the holding member 131 on the member 114 engages the holding member 132 on the lever 113 so as to hold the contacts open. This stops the motor 32. The spring 133 holds the holding member 132 in position to engage the holding member 131. When the plug 88 is connected with the socket 15a these circuits are completed by the switch actuating member 26 actuating the switch on the arm 12 supporting the trolley wheel, so that the roller 29 is moved before the street to be designated is reached so as to move the flexible strip 27 to bring the next street name opposite the glass 31 in the casing 5.

When it is desired to move the vehicle in the opposite direction, as in the return trip, the casing 5 with its mechanism is transferred to the other end of the vehicle, as shown in dotted lines in Fig. 1, and the plug 134 is inserted in the socket 16a on the vehicle. This plug and socket are similar to the ones hereinbefore described for the outgoing trip and I have given the parts and the conductors the same reference numerals with the exponent $a$. This plug and socket controls the mechanism hereinbefore described for starting and stopping the motor on the return trip and this control is accomplished by the notched wheel 73 and similar parts shown in Fig. 11 and diagrammatically in Fig. 16, and I have given these parts similar reference numerals with the exponent $a$.

The plugs 88 and 134 have extensions 5b and 5c, see Fig. 1. The plug sockets 15a and 16a are arranged farther away from the casing 5 at one end of the vehicle than at the other and the extensions 5b and 5c are made of different lengths so that the wrong plug cannot be inserted in the wrong socket.

In Figs. 17, 18 and 19 I have shown a circuit making and breaking device used in connection with the bow type of trolley. This type of trolley has two sets of pivoted arms 135 and 136, pivoted to the top of the vehicle, see Figs. 17 and 18, and which have a trolley engaging cross member 137. Connected with this cross member 137 is a circuit making and breaking device consisting of the insulating member 138 attached to the cross member 137 and the insulating member 139 slidable upon pins 140. The member 138 has the contacts 141 and 142 insulated from each other and the member 139 has the contacts 143 and 144 electrically connected together. These contacts are normally held separated by the springs 145 and 146. There is a pivoted switch actuating member 147 attached to the trolley wire 11 which engages the insulating member 139 as the vehicle moves along and moves the contacts 143 and 144 into contact with contacts 141 and 142 so as to complete the circuit across said contacts momentarily and through the conductors 15 and 16 leading to sockets 15a and 16a on the vehicle. This switch actuating member 147 is moved about its pivot 148 by the parts on the trolley and after these parts pass it, the spring 149 moves it back to its initial actuating position. The contacts 141 and 142 are connected to the conductors 15 and 16 which lead to the sockets 15a and 16a on the vehicle.

In Figs. 20 and 21 I have shown a circuit making and breaking device for use on a third rail construction. In this construction the third rail 150 is provided with a switch actuating member 151 which is connected therewith and insulated therefrom by the insulating material 152. Located on the vehicle is a circuit making and breaking device mounted in a casing 153 attached to the vehicle in any desired manner, as by the flexible devices 154. This circuit making and breaking device is provided with contacts 155 and 156 which are attached to conductors 15 and 16 leading to the sockets 15a and 16a on the vehicle. These contacts are spring contacts and are insulated from the casing 153. There is a pivoted lever 157 in the casing which has a part 158 engaging the spring 159 connected with the contact 155. A spring 160 normally holds this part in position so that the contacts are separated. As the vehicle moves along the pivoted lever 157 engages the switch actuating member 151 and is moved so as to bring the contacts 155 and 156 together to complete the circuit from the rail 150 through this lever 157 and through the conductors 15 and 16.

Figure 16:
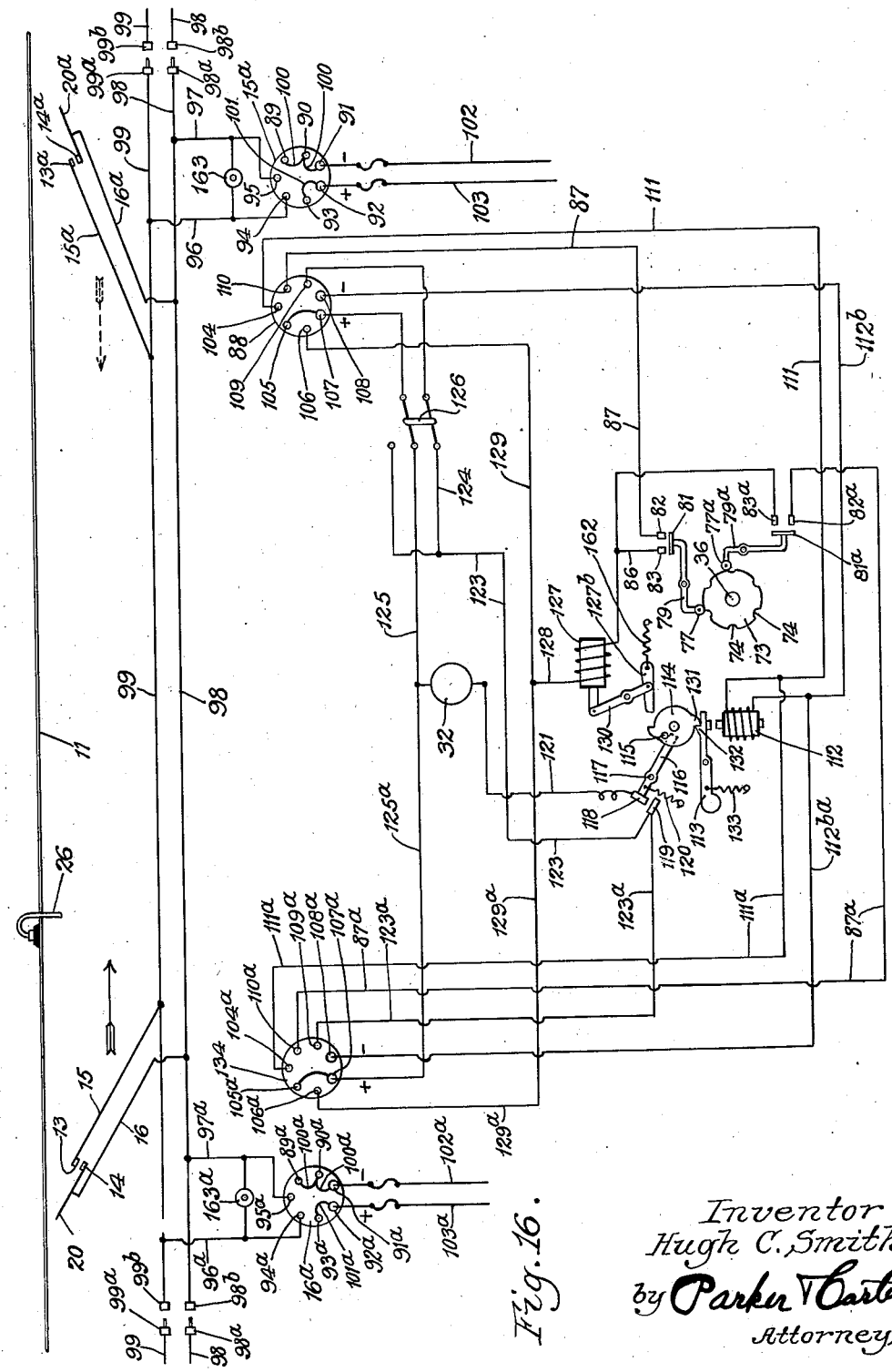
Fig. 16 is a diagrammatic view showing the electric circuits.

In Fig. 16 the contact 108 is connected by a conductor 112b with the magnet 112 and the contact 108a is connected by a conductor 112ba with the magnet 112. There is a spring 162 which moves the member 127b back to its initial position.

When the electromagnet 112 is energized and withdraws the armature 113 with its holding member 132 from contact with the holding member 131, the member 114 is rotated by the spring 114a, the member 114b stopping against the member 127b. The member 127b has a spring 127c to withdraw it to the position shown in Fig. 12.

There are push buttons 163 and 163 at opposite ends of the vehicle connected to the conductors 96 and 97 and 96a and 97a so that the operator of the vehicle can operate the indicators by hand by means of these push buttons in the event any of the various parts fail to automatically perform this function.

As shown in Fig. 16 the conductors 98 and 99 run the entire length of the vehicle and have plugs 98a and 99a and sockets 98b and 99b at their ends, so that two or more vehicles of a train may be electrically connected and the indicator in each vehicle of the train will be operated by one switch on the outside of the vehicle.

I claim:

A street indicating device for vehicles comprising two rollers, a flexible strip passing over said rollers, having thereon the names of the streets along the path of the vehicle, a casing in which said rollers are rotatably mounted, a street name reading window in said casing, one of said rollers being located opposite said window, a single motor for actuating said rollers located in said casing, supports for said casing at opposite ends of the vehicle, two plugs provided with connections for connecting the motor in circuit, two plug sockets, one at each end of the vehicle with which one of said plugs is connected when the casing is at one end of the vehicle and with which the other plug is connected when the casing is at the other end of the vehicle, two separate switches in said casing for said motor circuit, a single notched wheel in said casing operatively connected with said motor so as to be moved thereby, and a separate actuating member for each of said switches engaging the periphery of the notched wheel so as to actuate one of said switches when the casing is at one end of the vehicle and so as to actuate the other of said switches when the casing is at the other end of the vehicle.

HUGH C. SMITH.